May 29, 1928.
G. R. GUILD
1,671,929
STOCK CONTROL SYSTEM
Original Filed July 25, 1924   3 Sheets-Sheet 1
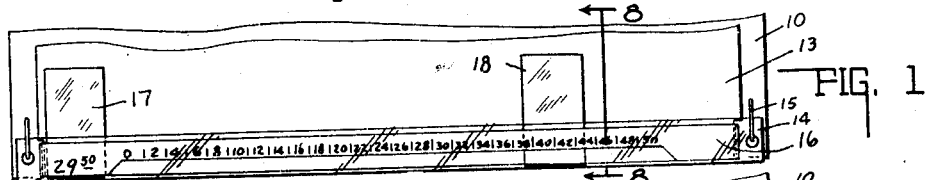
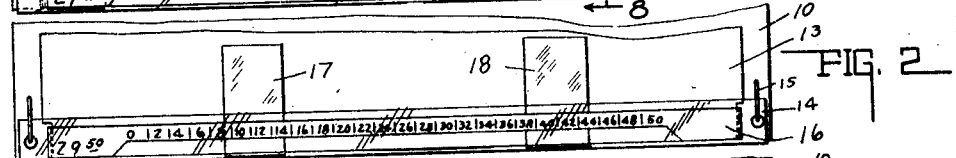
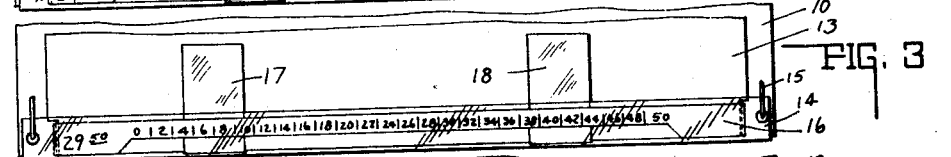
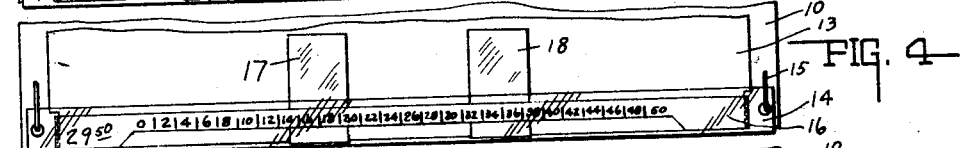
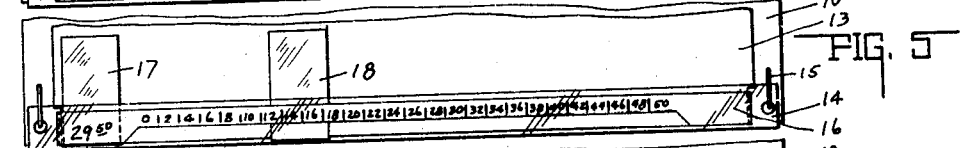
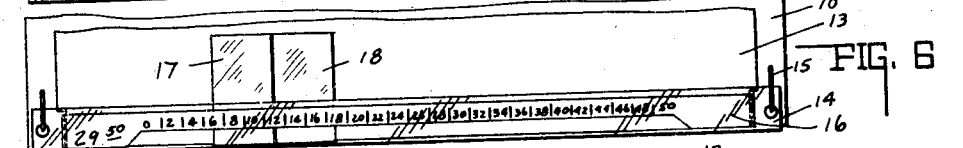
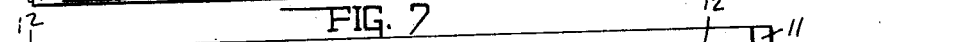
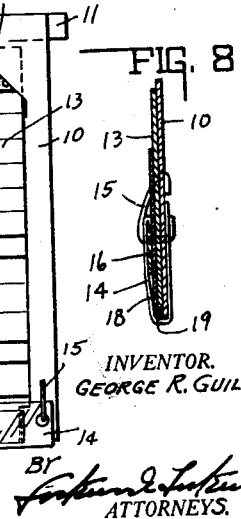
INVENTOR.
GEORGE R. GUILD.
BY
ATTORNEYS.

May 29, 1928.
G. R. GUILD
1,671,929
STOCK CONTROL SYSTEM
Original Filed July 25, 1924   3 Sheets-Sheet 2
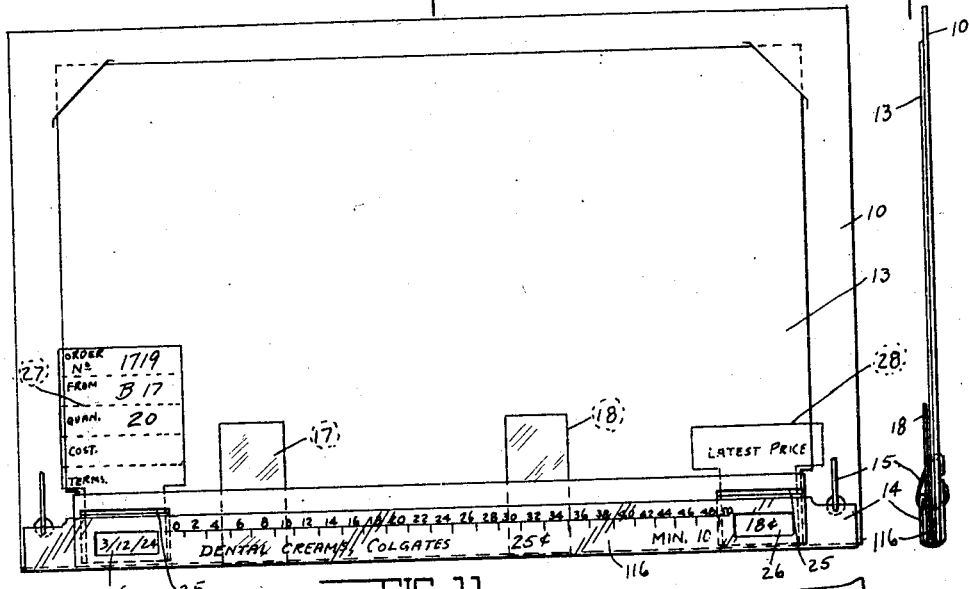
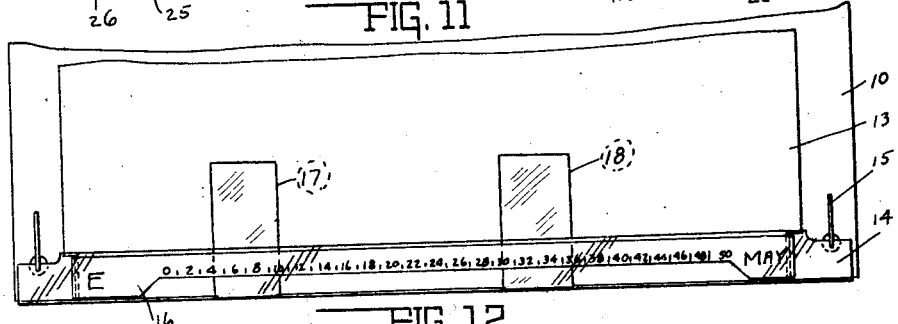
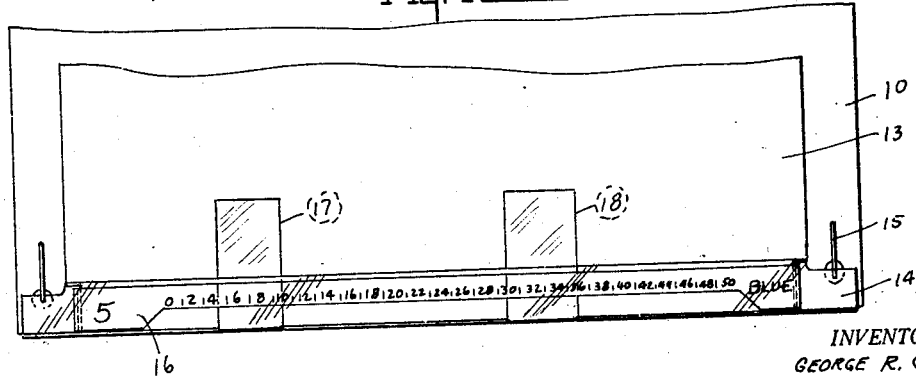
INVENTOR.
GEORGE R. GUILD,
BY
ATTORNEYS.

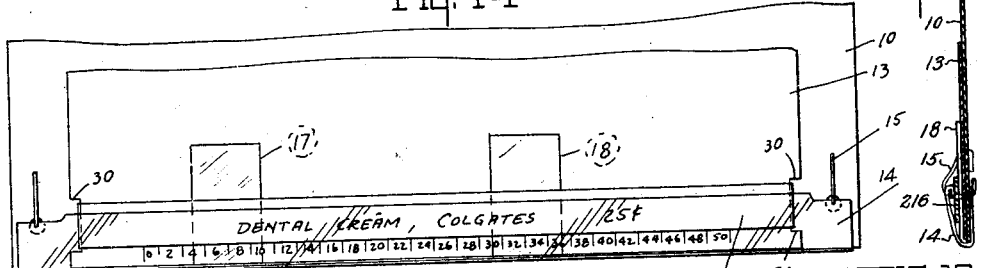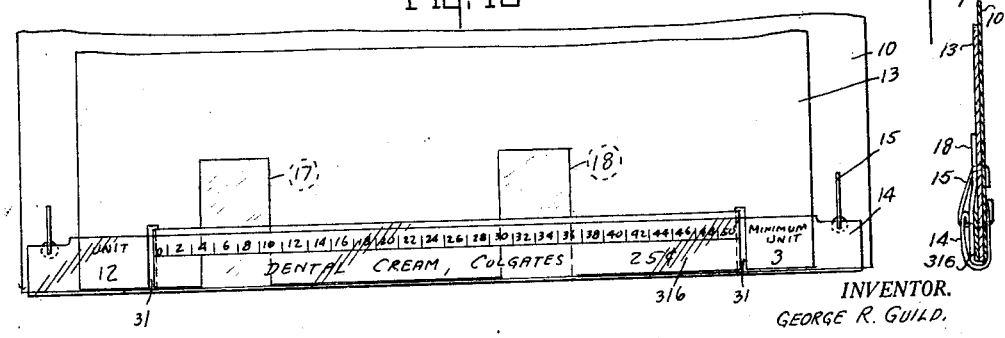

Patented May 29, 1928.

1,671,929

UNITED STATES PATENT OFFICE.

GEORGE R. GUILD, OF SNYDER, NEW YORK.

STOCK-CONTROL SYSTEM.

Application filed July 25, 1924, Serial No. 728,069. Renewed February 4, 1927.

This invention pertains to a system and means for controlling stock and styles of merchandise dealt in, principally by department stores, but which is applicable also to other types of retail stores, jobbing houses and factories, as well as warehouses and the like where a stock of goods is maintained.

The principal object of the invention is to provide a means to maintain a perpetual inventory of stock in various departments of a store to a very accurate degree. On the one hand, this acts to prevent the department from running out of stock, and, on the other hand, prevents the overstocking of the department. Heretofore, departments have been handicapped by running out of stock either on the selling floor, in reserve stock rooms, or in the warehouse, so as to have none on hand between that time and the time necessary to replenish that stock, thereby losing sales and possibly customers, and, on the other hand, merchandise which has not had the anticipated sale, has been overstocked to such an extent as to tie up large sums of money over a considerable period of time. The system embodying this invention provides a means for controlling the stock and merchandise in such a way that it is kept moving without the hazard of running out, and with the minimum investment tied up in reserve stock or stock on hand. This is accomplished in the manner which will be hereafter more specifically set forth and described.

The invention further accomplishes the purpose of causing the stock on hand to be moved and the elimination of "dead" or slow moving merchandise. The system and means employed therein, in a semi-automatic way, gives notice to the head of the department when certain merchandise has been in stock for a given period of time. By means of this notice, merchandise may be reduced in price or put on sale for the purpose of disposing of it, and at the end of an additional period of time, if it has not yet been disposed of, it can be further reduced or further effort may be made for its sale, so that it is finally disposed of and will not continue to remain unsold indefinitely. Due to the slow selling of such merchandise, as will be indicated by the system, the further purchase thereof or dealing therein may be avoided, so that such "dead" merchandise will be weeded out and the sales resistance caused thereby will thereafter be avoided. Otherwise, from an ignorance of the history of such merchandise, wherein this invention is not employed, repetition may occur.

Another feature of the invention, as applied to style merchandise, such as coats, suits, dresses and the like, in addition to the above, will permit of the visualizing thereof by the buyers and managers to such an extent as to enable them to control their purchases,—as to styles, colors, prices and sizes; to control their sale,—by giving special attention to those not readily moved, and reducing the price to provide ready sale; and further to prevent confusion by the return of garments sold at one price after other garments of the same style remaining in the department have been reduced in price for effecting the sale thereof.

At the present time, applicant's system has been successfully used in several large department stores as pertaining to the classes of comparatively staple articles, such as toilet goods and notions and to style merchandise such as women's and misses' dresses, coats, suits, sweaters and knit goods, petticoats, skirts, corsets and also furniture, house furnishings and warehouse merchandise in such manner as to fully establish the advantages above pointed out and the value thereof in reducing investment in stock carried thereby, and loss due to unsaleable or slow selling articles.

The means employed in the system for effecting this operation comprises briefly a card index system provided with sliding indicating tabs on a graduated scale as illustrated in the accompanying drawings and which will hereafter be more specifically set forth and described. In addition to the indicating tabs and their relative positioning on a graduated scale, another structural feature of the invention plays an important part, and that is the removable indicating strips and the means for interlocking them about the ends of the cards along the lower edge thereof, whereby they will be held in proper position.

The full nature of the invention will be understood from the accompanying drawings and the following description and claims:

In the drawings, Fig. 1 is a plan view of the lower portion of one of the cards embodied in the system, which card represents a record of garments, such as dresses, at a certain price line, showing the first position of the indicating tabs at inventory. Fig. 2 is the same as Fig. 1, showing the relative positions of the tabs after sales have been made. Fig. 3 is the same as Fig. 2, showing the relative positions of the tabs after sales have been made and after some garment have been returned by customers and placed back into stock. Fig. 4 is the same as Fig. 3, showing the relative positions of the tabs upon the further sale of goods and upon the return to the manufacturer of goods formerly in stock. Fig. 5 is the same as Fig. 4 showing the relative positions of the tabs at the beginning of a new sales period while Fig. 4 is assumed to represent the end of the preceding sales period. Fig. 6 is the same as Fig. 5, showing the relative positions of the tabs when the stock has been exhausted by sales of that amount. Fig. 7 is a plan view of one type of record card, being the year card for garment merchandise under price lines, with the tabs positioned on the scale to show the result in sales and stock on hand of the factors of the transactions expressed on the year card. Fig. 8 is a section taken on the line 8—8 of Fig. 1. Fig. 9 is a plan view showing a modified form of card as applied to toilet goods. Fig. 10 is an end elevation thereof. Fig. 11 is a plan view of a card applied to the record of seasonable merchandise. Fig. 12 is a plan view of a card used in recording merchandise in accordance with colors and sizes. Fig. 13 is a front elevation showing the arrangement of a group of the cards arranged by price lines. Fig. 14 is a plan view of a card showing a modified form thereof. Fig. 15 is the same as Fig. 14 showing an end elevation thereof. Fig. 16 is a plan view showing a modified form. Fig. 17 is the same as Fig. 16 showing an end elevation thereof.

In the drawings there is illustrated in Fig. 7 a record card holder or backing 10, adapted to be supported on a rack by a cross piece 11. A plurality of such holders may thus be supported, one over the other, so that the lower edge is exposed, as is commonly the practice in card record systems. This arrangement of the cards in the rack is illustrated in Fig. 13. The support is provided with slots 12 for receiving the upper corners of the record cards 13. Along the lower edge of the card support or backing 10 a celluloid strip 14, doubled lengthwise so as to be U-shaped in cross section is secured by the staples 15. The card is printed in any suitable manner, and, as shown in Fig. 7 there are provided spaces for recording month by month, the transactions affecting the garments in stock at the particular price line represented by that card, and as each transaction occurs the sales or stock tab is moved so as to always visibly register the correct balance.

However, any other desirable information may be recorded on the record card, and the same may be printed and arranged in any suitable manner for giving the desired information. Along the bottom edge of the card the name, price, style, or other indicia of the goods may be written as shown in Figs. 1, 9, 11, and 13.

Mounted over the lower edge of the card and inserted under the face of the celluloid strip 14, there is provided an insertable strip 16, which has the lower central portion cut away so as not to obstruct the matter written on the lower edge of the card, whereby the lower portion of the tabs positioned along the lower edge of the record card and underneath this strip may be visible, as shown in Fig. 1.

However, if desired, the scale may be printed on the record card and the description and name of the goods may be entered on the inserted strip, as shown in Fig. 14.

As the ends of this inserted strip wrap around the edges of the record card, and as it rests within the celluloid holder, it forms a permanent index and remains in place when a record card is removed and a new one entered in its stead, thus the index of the entire file of cards is not disturbed by their removal when replacing old cards by new ones.

If desired, this inserted strip may extend above the edge of the celluloid holder, and be held in place in that holder by slits in the record card, as shown in Fig. 16.

Slidably mounted under the celluloid strip 14 and the strip 16 so as to lie adjacent the face of the card, there is a pair of indicating tabs 17 and 18. Said tabs are provided on one end with a curved or flanged portion 19 adapted to extend along the lower edge of the card so as to be maintained in place. Said tabs may be formed of celluloid or any other suitable material and are preferably given distinctive colors, such that the tabs 17 and 18 may be readily distinguished.

For the purpose of illustrating the manner of operating the system, two methods will be described, the one a method of recording style merchandise, such as garments of the same price line, and the other a method of recording staple merchandise, such as toilet goods. For example, there may be many similar garments all priced alike, on hand at the beginning of a period, as, for instance, 38 garments at $29.50. The stock tab 18 is then set with its left edge intersecting the 38 on the scale, see Fig. 1. Out of this stock, sales are made, day by day, and the sales tab 17 is moved along the scale to indicate these sales. For instance, in Fig. 2 the stock tab 18 still remains at 38, but the sales tab 17 has moved until its right edge intersects 14 on the scale, thus recording 14 garments sold to date out of a stock of 38 garments or 24 garments on hand. Customers who have purchased garments may return some, and this is shown recorded in Fig. 3 by a reverse movement of the sales tab to 10 on the scale, by reason of 4 garments being returned by customers and placed back into stock. The net sales are therefore 10 out of a stock of 38, or 28 garments on hand. Further sales take place, until 20 garments have been sold, as shown in Fig. 4, and during the same period there have been 6 unsatisfactory garments returned to the manufacturer, or 6 garments reduced to a lower price line, thus leaving 20 garments sold out of a stock of 32 garments, or 12 garments on hand.

At the same time that these operations are recorded, as above described, by movements of the tabs along the scale, suitable entries have been made on the record card. It will therefore be observed that the tabs actually operate as a visualizing agent of the computations on the record card, giving the net results of card entries at all times.

If, at the end of the sales period, the tabs are as shown in Fig. 4, the entries on the record card should agree, and should show net sales of 20 garments, out of a stock of 32 garments, with a consequent balance of 12 garments remaining on hand, and the card would be so totalled.

The sales period being over, and totals suitably recorded on the card, a new card can be entered and the tabs moved leftward along the scale, still maintaining the scale interval of 12 garments, until the sales tab is at zero and the stock tab is at 12 on the scale, and the new sales period begins. This is shown by Fig. 5, which is a re-positioning of the tabs shown in Fig. 4, maintaining the same record of 12 garments still on hand. Now, if without any increase in stock, additional sales are made in the new sales period day by day until that stock of 12 garments is exhausted, the sales tab will approach the stock tab, and will lie adjacent to it, each recording 12 on the scale, when the stock is exhausted, or net sales of 12 garments out of a stock of 12 garments with a consequent balance of no garments on hand.

Should garments be on order, a ticket, as shown in Fig. 9, can indicate that fact, which ticket will be removed and the stock tab re-set to 50 on the scale when the 20 articles on order are received.

Thus in a panel consisting of many cards, the lower edge of each exposed in a celluloid holder, and each card recording a different price line, there is afforded, by means of the positioning of these sales and stock tabs on their scales, an instant and ready means of visualizing the net sales of each of many different price lines, and the corresponding stocks against which these sales are being made. Such a panel is shown in Fig. 13.

The same principle can be made use of to record the number of garments sold and on hand according to the months in which they were purchased, thus affording an ageing record, see Fig. 11. Also, the principle can be made use of to record the garments of each color, or size, sold during a period out of a certain stock on hand (see Fig. 12).

As applied to staple merchandise, for example, toilet goods, wherein several thousand articles are maintained in stock and from which sales are made, the same principle applies. Each different item of merchandise is given a card, and upon this card the sales and stock tabs are set on the scale, exactly as described for style merchandise articles. During the period, usually a calendar month, incoming stock is recorded on the scale by a movement of the stock tab 18, and withdrawals against this stock are recorded by movement of the sales tab 17. At the end of the period the positions of these tabs on the scale can be noted and entered as totals on the record card, and the tabs re-set as described for style merchandise articles and shown in Fig. 5. The description given of Figs. 1, 2, 3, 4, 5, and 6 as applied to a price line record for style merchandise articles applies also to a record staple merchandise, merely substituting the name of the article on the card for staple merchandise, for the amount of the price line on the card as shown for style merchandise.

By reason of this means of recording the condition of the staple or toilet goods stock, it may be replenished and controlled entirely by the positioning of the tabs through clerks rather than through a manager, officer or buyer of a concern, as heretofore. Furthermore, since the clerk in strict accordance with the above places a new order for the merchandise, when the supply reaches a certain point, there is little or no danger of its being entirely depleted with the accompanying loss of sales and customers. On the other hand, assume in this instance, (Fig. 9) that the quantity to be purchased is 20 dozen, and the minimum quantity to be reached before the order is given is 6 dozen on hand, there will never be more than 36 dozen of such articles on hand, which will effect a saving in reserve stock space and investment, as well as actual loss if it is a slow selling article.

In event the green sales tab 17 is not moving or only moved slightly over a period of 30 days, for example, this fact will be readily observed by glancing over the entire file.

The buyer of the department will immediately notice an article that is not selling. He can then investigate as to that particular article to determine the cause, and arrange the selling policy accordingly. Thus the system enables the manager to weed out from the several thousand articles on sale, by simply glancing over the file, articles which in one way or another should be eliminated from the stock, and which should not be dealt in thereafter. Heretofore, even though such stock slowly sold over a long period of time, when it was exhausted, an appreciable new supply would be obtained since there would be nothing to visibly indicate its slow selling ability.

Although an example of the system has been given with respect to style merchandise and toilet articles or similar staples, the same system and sliding tab arrangement may be applied to any articles of stock, which articles may also be recorded in various ways, such as by price lines, seasons, colors, sizes, etc., as shown herein.

In the modified form shown in Fig. 9 the indicating strip 116 is provided with the scale printed thereon somewhat above its lower edge. The ends of said strip are folded around the inwardly cut edges of the card 13 as above described for holding it in place. Adjacent each end of the strip 116 there are provided slots 25 and openings 26 immediately below them. The order card 27 may be inserted in the slot so that the date written thereon may be visible through the opening 26. On the other end the "latest price" ticket 28 may be inserted through the corresponding slot 25 so that the "latest price" written thereon will be visible through the opening 26. This type of card is particularly adaptable to be used for toilet goods and similar staple articles, because the strips can be printed in sheet form and cut into strips after the names of articles have been typed on them.

In the modified form shown in Fig. 11 the structure is similar to that shown and described in respect to Figs. 1 to 8 inclusive, as applied to recording goods with respect to seasons. For this purpose on the left hand end of the indicating strip 16 the code letter of the season is written, and on the right hand end the month is written. For each class of goods, such as ladies' garments, there may be a group of 12 or more such cards, one or more for each month. The position of the red and green tabs will therefore indicate the sale and stock on hand of the January, February, or March, etc., garments.

The modified form shown in Fig. 12 may be used to record the sale and stock on hand of garments with respect to colors and sizes. In this instance the strip 16 may have written on the left hand end the code number for a certain color whereas on the right hand end the color itself may be written. The cards are grouped in accordance with the general nature or classification of the goods, and the various sizes of the garments of any particular color which are on hand or have been sold will be indicated in the body of the card, not shown herein. It is sufficient for the purpose of general classification as to colors and sizes, to designate a certain color on any single card of that group. The modified form shown in Fig. 14 illustrates the scale printed on the lower edge of the card 13, said card having mounted thereon immediately above the scale the indicating strip 216 which has its ends folded back under the card between the shoulders 30 formed by cutting a shallow recess in each edge of the card of the same width as the strip. This arrangement securely interlocks the card and strip, particularly when positioned between the celluloid strip and backing 10.

In the modified form shown in Fig. 16 the card 13 is provided with upwardly extending slots 31 in the lower edge thereof through which the ends of the indicating strip 316 may extend so as to be folded back adjacent the back surface of the card 13. The card 13 will therefore have space left adjacent each end thereof for having written thereon the number of articles in a unit and the minimum number of units that there should be on hand before placing a new order or any other desired information.

The invention claimed is:

1. A perpetual inventory and stock record system, comprising a plurality of record cards, a scale associated with each of said cards, means associated with said scale for indicating on said scale the quantity of merchandise on hand, and a second means independent of said first-mentioned means for indicating thereon the quantity sold.

2. A perpetual inventory and stock record system, comprising a plurality of record cards, a scale associated with each of said cards, and indicating tabs slidably mounted on each of said cards with respect to said scale for indicating thereon by their relative position to each other the quantity of merchandise on hand.

3. A perpetual inventory and stock record system, comprising a plurality of record cards, a scale associated with each of said cards, and a pair of indicating tabs slidably mounted on each card with respect to said scale for indicating thereon by their relative position to each other the quantity of merchandise sold as against the quantity on hand.

4. A perpetual inventory and stock record system, comprising a plurality of record cards, a scale associated with each of said cards, a tab slidably mounted on said card with respect to said scale for indicating thereon the quantity of merchandise on hand, and a second tab slidably mounted thereon and movable with respect to said first-mentioned tab for indicating the quantity of merchandise sold as against the quantity on hand.

5. A perpetual inventory and stock record system, comprising a plurality of record cards, an indicating scale positioned along the lower edge of each of said cards, a transparent strip secured to the lower edge of each of said cards through which said scale may be observed, and a pair of tabs slidably mounted between said transparent strip and card adapted to be slidably moved to a position for indicating by their relative position to each other on said scale the quantity of merchandise on hand.

6. A perpetual inventory and stock record system, comprising a record card and a pair of tabs slidably mounted on said card for visualizing by their relative positions the quantity of merchandise on hand and the quantity of merchandise sold during a given period as against the original stock.

7. In a perpetual inventotry and stock record system, a supporting back piece, a transparent strip secured at its ends over the lower edge thereof, a record card adapted to be inserted between said transparent strip and back piece, said record card being cut away adjacent its ends, and an indicating strip adapted to be positioned adjacent the lower edge of said record card behind said transparent strip and having its ends interlocked therewith by being folded about said cut away portion.

8. In a perpetual inventory and stock record system, a supporting back piece, a transparent strip secured at its ends over the lower edge thereof, a record card adapted to be inserted between said transparent strip and back piece, projecting shoulders formed on the ends of said record card by cutting away a portion thereof, and an indicating strip mounted between said record card and transparent strip having its ends folded about the ends of said record card in position to abut the shoulders formed thereon for maintaining the same in position with respect thereto.

9. In a perpetual inventory and stock record system, a supporting back piece, a transparent strip secured at its ends over the lower edge thereof, a record card adapted to be inserted between said transparent strip and back piece, said record card being provided with reduced ends adjacent the lower edges thereof whereby a shoulder is formed between said reduced ends and the body of the card, and an indicating strip adapted to be positioned along the lower edge of said card between the face thereof and said transparent strip, said indicating strip having its extreme ends folded about the reduced edges of the card to abut said shoulders and be interlocked therewith in a given position.

In witness whereof, I have hereunto affixed my signature.

GEORGE R. GUILD.

CERTIFICATE OF CORRECTION.

Patent No. 1,671,929. Granted May 29, 1928, to

GEORGE R. GUILD.

It is hereby certified that error appears in the printed specification of the above numbered patent requiring correction as follows: Page 3, line 101, after the word "record" insert the word "for"; and that said Letters Patent should be read with this correction therein that the same may conform to the record of the case in the Patent Office.

Signed and sealed this 31st day of July, A. D. 1928.

(Seal)

M. J. Moore,
Acting Commissioner of Patents.